United States Patent [19]

Yamamoto et al.

[11] Patent Number: 5,279,782
[45] Date of Patent: Jan. 18, 1994

[54] METHOD FOR MAKING WEATHER STRIPS WITH "SUEDE APPEARANCE"

[75] Inventors: Yuji Yamamoto; Taizo Kunimura; Hiroshi Miyachi; Shozaburo Dobashi; Hisaichiro Uchida, all of Hiroshima, Japan

[73] Assignees: Hiroshima Kasei Ltd., Hiroshima; Tosco Co., Ltd., Tokyo, both of Japan

[21] Appl. No.: 956,739

[22] Filed: Oct. 5, 1992

Related U.S. Application Data

[63] Continuation-in-part of Ser. No. 747,078, Aug. 19, 1991, abandoned.

[30] Foreign Application Priority Data

Aug. 17, 1990 [JP] Japan ..................... 2-217299

[51] Int. Cl.$^5$ .................... B29C 47/06; B29C 35/02
[52] U.S. Cl. ................... 264/162; 156/244.19; 264/167; 264/171; 264/177.1; 264/177.2; 264/236; 428/15; 428/31; 428/904
[58] Field of Search ............. 264/109, 122, 115, 116, 264/138, 162, 171, 174, 177.1, 177.2, 167, 210.6, 236; 428/31, 904, 15; 156/244.19, 181; 425/131.1

[56] References Cited

U.S. PATENT DOCUMENTS

| | | | |
|---|---|---|---|
| 3,041,193 | 6/1962 | Hamway et al. | 428/904 |
| 3,059,292 | 10/1962 | Harris | 264/171 |
| 3,549,398 | 12/1970 | Watson | 264/162 |
| 3,719,549 | 3/1973 | Mittman | 428/904 |
| 3,776,790 | 12/1973 | Harrington et al. | 264/162 |
| 3,836,412 | 9/1974 | Boustany et al. | 264/109 |
| 4,233,349 | 11/1980 | Niederhauser | 156/181 |
| 4,381,273 | 4/1983 | Azzola | 264/162 |
| 4,442,167 | 4/1984 | Iwasa et al. | 428/904 |
| 4,698,193 | 10/1987 | Bernitz et al. | 425/131.1 |
| 4,843,763 | 7/1989 | Mesnel | 156/244.19 |

FOREIGN PATENT DOCUMENTS

| | | | |
|---|---|---|---|
| 54-39442 | 11/1979 | Japan | 428/904 |
| 59-24640 | 2/1984 | Japan | 264/162 |
| 59-36712 | 9/1984 | Japan | 428/904 |
| 60-71779 | 4/1985 | Japan | 428/904 |
| 62-45790 | 2/1987 | Japan | 428/904 |
| 62-128828 | 6/1987 | Japan | 428/904 |

*Primary Examiner*—Jeffery Thurlow
*Assistant Examiner*—Mathieu Vargot
*Attorney, Agent, or Firm*—Browdy and Neimark

[57] ABSTRACT

A method for making a rubbery weatherstrip having a suede appearance and a suede feel includes a step for coextruding a welt portion of a weatherstrip and an outer rubber layer containing fibrillated fibers, namely bast fibrillated fibers, leaf fibrillated fibers and mixture thereof, or a welt portion of a weatherstrip, a sealing portion and an outer rubber layer containing fibrillated bast or leaf fibers to adhere these sheets, a step for vulcanizing the entire portions thereof, and a step for subjecting the outer rubber layer to buff processing.

11 Claims, 1 Drawing Sheet

METHOD FOR MAKING WEATHER STRIPS WITH "SUEDE APPEARANCE"

This application is a continuation-in-part application of U.S. Ser. No. 747,078 filed on Aug. 19, 1991, now abandoned.

BACKGROUND OF THE INVENTION

The present invention relates to a method for making a weather strip having a suede appearance and a suede feel.

Generally speaking, weather strips are mounted to body flanges of car doors. Weather strips for automobiles are mounted onto body flanges for waterproofing, soundproofing and dustproofing.

As shown in FIG. 1, the weather strip in common use comprises a generally U-shaped welt 7 having a core metal 6 in the interior, with a plurality of lips 1, 2, 3 and 4 projecting from the inner surfaces of the two leg portions, and a hollow sealant 8 attached to the outer surface of one leg portion of the welt 7.

Of course, since a variety of weather strips are mounted on different places of cars, they have different shapes. Weather strips are made of EPT (ethylene propylene terpolymer), CR (chloroprene rubber) or SBR (styrene butadiene rubber) as a main material. As occasion demands, weather strips are formed in solid type or sponge type.

Until recent years, most of the requirements of users for automobiles have centered upon performance as exemplified by fuel economy, speed and other mechanical aspects of automobiles. More recently, user's interest has focused on the design aspect of automobiles which appeals to the aesthetic sense of users. By design is meant both the outer and inner appearance. As mentioned above, weather strips are mounted on body flanges of cars for waterproofing, soundproofing and dustproofing. What is important is that part of the melt portion of weather strips which are mounted on body flanges of cars is visible inside. Generally speaking, a welt portion of a weather strip is formed of a black colored rubber in which a core metal is incorporated. Since the black color rubber part is visible inside the car, this somewhat impairs the interior appearance of cars. It was once attempted to make the welt of colored rubber but this idea was never put into commercial practice, since unlike plastics, rubber has no transparency and the colors it can take on are not only dull but unable to present intermediate shades. As a result, welts made of colored rubber are too monotonous in color to provide designs having aesthetic appeal. Under these circumstances, it is strongly desired to develop a weather strip that appeals more to the aesthetic sense of users and which hence gives an impression of "high quality".

SUMMARY OF THE INVENTION

The present inventors have conducted extensive research. As a result, they have found that a weather strip with a "suede appearance" and "suede feel" or texture that appeals more to the aesthetic senses of users and which gives an impression of "high quality" can be obtained by a method which comprises placing an outer rubber layer with a specific fiber outside a welt portion of a weather strip and subjecting the outer rubber layer to buff processing.

The present invention is based on this discovery and relates to a method for making a weather strip having a suede appearance and a suede feel which comprises;

a step for coextruding a welt portion of a weather strip and an outer rubber layer containing fibrillated bast or leaf fibers, or a welt portion of a weather strip, a sealing portion and an outer rubber layer containing fibrillated hemp fibers to adhere these sheets, a step for vulcanizing the entire portions thereof, and a step for subjecting the outer rubber layer to buff processing.

This invention also relates to a method for making a weather strip having a suede appearance and a suede feel which comprises, a step for coextruding a welt portion of a weather strip and an outer rubber layer containing fibers having a length of 0.1-5 mm and a diameter of 1-10 µm, or a welt portion of a weather strip, a sealing portion and an outer rubber layer containing fibers having a length of 0.1-5 mm and a diameter of 1-10 µm to adhere these sheets, a step for vulcanizing the entire portions thereof, and a step for subjecting the outer rubber layer to buff processing.

DETAILED DESCRIPTION OF THE INVENTION

The materials constituting the welt portion of weather strip includes, for example, EPT and a mixture of EPT and other rubbers, such as natural rubber, SBR and/or a thermoplastic resin, such as polyethylene.

The materials constituting the outer rubber layer include, for example, EPT, CR and SBR. EPT is preferable.

The preferable material constituting the sealing portion is EPT.

The buff processing may be carried out by pressing the outer rubber layer containing the bast or leaf fibrillated fibers onto the rotating sandpaper mounted on an endless belt. The buff processing can also be carried out by other methods.

Figure 1:
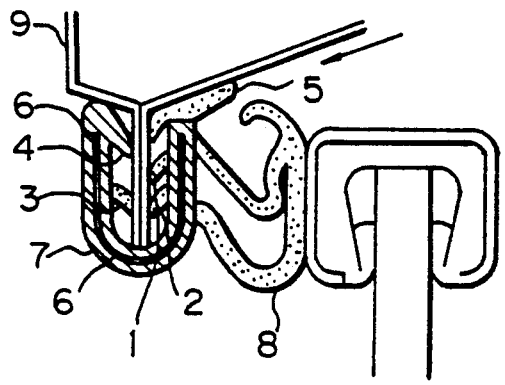
FIG. 1 is a cross-sectional view of a conventional weather strip.
Figure 2:
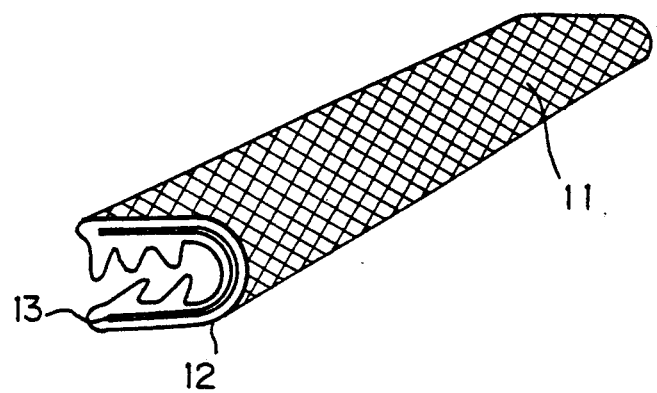
FIG. 2 is a perspective view of a weather strip prepared according to the present invention.

This invention is further explained by the accompanying drawings. The present first invention is shown in FIG. 2. In FIG. 2, a core metal is shown at 13; welt portion of weather strip is shown at 12 and outer rubber layer containing fibers is shown at 11. Welt portion 12 and outer rubber layer 11 are extruded by two extruders to adhere the two sheets. The outer rubber layer containing fibers is subjected to buff processing, before or after the two sheets are subjected to forming.

Figure 3:
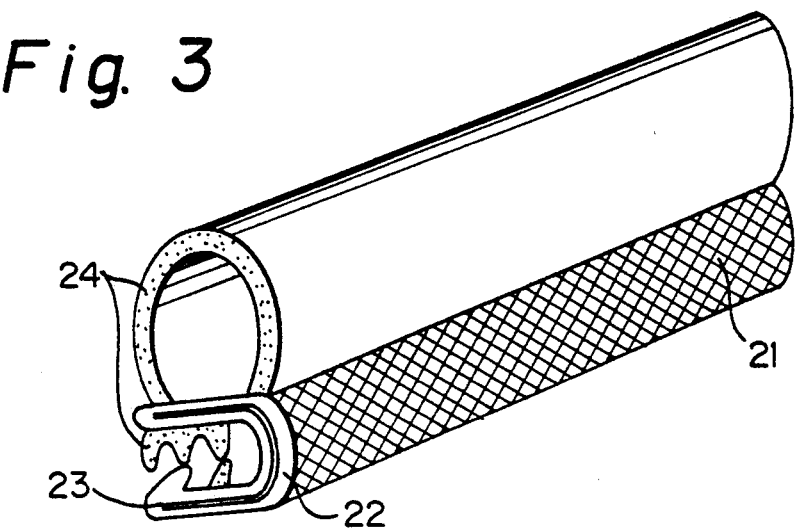
FIG. 3 is a perspective view of another weather strip prepared according to the present invention.

The second embodiment of the present invention is shown in FIG. 3. In FIG. 3, welt portion of weather strip is shown at 22. Core metal which is present in welt portion 22 is shown at 23. Sealing portion and outer rubber layer containing specific fibers are shown at 24 and 21, respectively. Welt portion 22, sealing portion 24 and outer rubber layer 21 are extruded by three extruders to adhere the three sheets. The outer rubber layer containing fibers is subjected to abrasive treatment, before or after the three sheets are subjected to forming.

The fibers employed in the present first invention are fibrillated bast or leaf fibers.

Examples of the bast fibrillated fiber include ramie fibrillated fiber, linen fibrillated fibers, jute fibrillated fiber, hemp fibrillated fiber. Examples of leaf fibrillated fiber include abaca fibrillated and henequen fibrillated fiber. Dry ramie fibrillated fiber is most preferable. The fibers having higher wearing properties than that of the rubber used are more preferable. The preferable fibers have the following factors:

fiber length: 0.1–5 mm
fiber diameter: 1–10 μm
crystallinity: 20–50%
water content: 7–10%.

The amount of fibers incorporated in the outer rubber layer is preferably in the range of 5–50 PHR.

The fibers employed in the present second invention have a length of 0.1–5 mm and a diameter of 1–10 μm. In the present second invention, the fiber is selected from the group consisting of natural fibers, such as cellulose or the like and synthetic fibers, such as polyamide fiber, polyester fiber, aramid fiber and mixtures thereof.

A pigment or a colored fiber may be added to the outer rubber layer.

The preferable embodiment is explained by the non-limiting drawings. In the following embodiment, outer rubber layer (suede) is called A. Welt portion of weather strip (solid type) is called B. Sealing portion (sponge type) is called C. A and B are extruded by two extruders to adhere A and B; and A and B are continuously vulcanized; A is subjected to buff processing; and A and B are subjected to hosing. The resulting product is shown in FIG. 2. In FIG. 2, A, B and a core metal are shown at 11, 12 and 13, respectively.

Another preferable embodiment is explained. A, B, a core metal and C are extruded by three extruders; and A is subjected to abrasive treatment; and A, B and a core metal are subjected to forming. The resulting product is shown in FIG. 3. A, B, C and a core metal are shown at 21, 22, 24 and 23, respectively.

The following embodiments may be used in the present invention:

(1) Product formed of only A

A is extruded by one extruder, continuously vulcanized and subjected to buff processing. A may be reinforced by core metal or core material.

(2) Product formed of A and B

A and B are extruded by two extruders to adhere A and B. A and B are continuously vulcanized and A is subjected to buff processing.

(3) Product formed of A and C

Product is prepared as in embodiment (2).

(4) Product formed on A, B and C

A, B and C are extruded by three extruders to adhere these sheets. A, B and C are continuously vulcanized and A is subjected to buff processing.

EXAMPLE

A Composition

| Components | parts by weight |
| --- | --- |
| Esprene 505A | 100 |
| dry bast fibrillated fiber(*) | 20 |
| light calcium carbonate | 100 |
| Stractol 212 (processing aid) | 10 |
| Sonic PW-380 (process oil) | 10 |
| Zinc oxide No. 1 | 5 |

-continued

| Components | parts by weight |
| --- | --- |
| pigment for rubber | 3 |
| Bester 18 (hygroscopic agent) | 5 |

(*)Dry fibrillated ramie fiber has the following factors:
fiber length 0.8 mm
fiber diameter about 2–7 μm
crystallinity about 40%
water content about 8%

The above components were milled by Banbury mixing for 5 minutes.

| Components | parts by weight |
| --- | --- |
| sulfur | 2 |
| 2-mercaptobenzothiazole (vulcanization accelerator) | 2 |
| zinc dimethyl dithiocarbamide (vulcanizing accelerator) | 2 |
| dipentamethylenethiuram tetrasulfide (vulcanization accelerator) | 2 |
| stearic acid | 1 |

The components were added by roll addition.

B COMPOSITION (SOLID COMPOSITION)

| Component | parts by weight |
| --- | --- |
| Esprene 512 | 100 |
| Zinc oxide No. 3 | 5 |
| stearic acid | 1 |
| FEF carbon black | 140 |
| process oil (Sonic P-200) | 80 |
| paraffin wax | 5 |

The above components were milled by Banbury mixing.

| | |
| --- | --- |
| 2-mercaptobenzothiazole (vulcanization accelerator) | 2 |
| tetramethylthiuram disulfide (vulcanization accelerator) | 1 |
| zinc dimethyl dithiocarbamate (ulcanization accelerator) | 2 |
| sulfur | 1.5 |

The above components were added by roll addition.

C COMPOSITION (SPONGE COMPOSITION)

| Component | parts by weight |
| --- | --- |
| Esprene 501 A | 100 |
| stearic acid | 1 |
| Zinc oxide No. 1 | 20 |
| calcined clay | 65 |
| calcium carbonate | 35 |
| SRF carbon black | 50 |
| process oil (Sonic P-200) | 45 |

The above components were blended by Banbury mixing.

| | |
| --- | --- |
| zinc diethyl dithiocarbamate (vulcanization accelerator) | 3.6 |
| 2-mercaptobenzothiazole (vulcanization accelerator) | 2.4 |
| tetramethylthiuram disulfide (vulcanization accelerator) | 1.0 |
| triethanol amine | 1.0 |
| sulfur | 1.0 |

-continued

| Celmike A (foamig agent) | 5 |
| Celtone N | 5 |

The above components were added to roll addition.

EFFECTIVENESS (1) Since the surface layer containing short fibers is subjected to buff processing and refractive index of foamed rubber layer is different from that of the short fiber, the surface is roughened to form a complex surface layer, whereby it becomes possible to manufacture a colored weather strip that gives a "suede feel" with shadows and volume.

(2) Since the fibrillated bast or leaf fiber contains water, the rubber layer may be expanded to an extent by foaming to about 1.6 (density of about 0.74), whereby a softened rubber layer can be obtained. The short fibers are exposed to the surface by the buffing treatment; and the surface attains a "suede feel".

The weather strip of the present invention accordingly has aesthetic appeal for the interior design of cars.

MILLING

Each of the components constituting A, the components constituting B and the components constituting C is milled by Banbury mixer.

Vulcanizing agents are added to the components in mixing roll.

EXTRUDING

Weather strips are prepared by two or three extruders.

CONTINUOUSLY VULCANIZING

The vulcanization is carried out at 220° C. for 7 minutes with hot air.

BREAKING OF CORE METAL

After vulcanizing, only a core metal is broken in order to impart flexibility to weather strip.

BUFF PROCESSING

Sanding Belt (Sankyo Rikagaku Co., Ltd.) is used. Only A is subjected to buff processing at a belt speed of 1380 m/minute.

FORMING

Melt portion with core metal of weather strip is bent in a "U shape".

The product obtained according to the method given in the above example had a "suede appearance" and "suede feel".

In this example, water contained in the fibrillated fiber and volatile components contained in the rubber were utilized as a blowing agent. When vented extruder is used, volatile components are expelled from the rubber layer. Therefore it is necessary to add a blowing agent to the rubber layer. In this case, conventional foaming agents can be used.

What is claimed is:

1. A method for making a weather strip having a suede appearance and a suede texture which comprises:
a step for coextruding and adhering a welt portion of a weather strip and an outer rubber layer containing fibrillated fibers selected from the group consisting of bast fibrillated fibers, leaf fibrillated fibers and mixtures thereof, or a welt portion of a weather strip, a sealing portion and an outer rubber layer containing fibrillated bast or leaf fibers.
a step for vulcanizing the entire portions thereof, and
a step for subjecting the outer rubber layer to buff processing.

2. The method of claim 1 wherein said fibrillated fibers are bast fibrillated fibers.

3. The method of claim 2 wherein said bast fibrillated fibers are selected from the group consisting of ramie fibrillated fibers, linen fibrillated fibers, jute fibrillated fibers, hemp fibrillated fibers and mixtures thereof.

4. The method of claim 1 wherein said fibrillated fibers are leaf fibrillated fibers.

5. The method of claim 4 wherein said leaf fibrillated fibers are selected from the group consisting of abaca fibrillated fibers, henequen fibrillated fiber and mixtures thereof.

6. The method of claim 1 wherein said bast fibrillated fibers have a length of 0.1-5 mm and a diameter of 1-10 μm.

7. A method for making a weather strip having a suede appearance and a suede texture which comprises:
a step for coextruding and adhering a welt portion of a weather strip and an outer rubber layer containing fibrillated fibers having a length of 0.1-5 mm and a diameter of 1-10 μm, or a welt portion of a weather strip, a sealing portion and an outer rubber layer containing fibrillated fibers having a length of 0.1-5 mm and a diameter of 1-10 μm, said fibrillated fibers being selected from the group consisting of bast fibrillated fibers, leaf fibrillated fibers and mixtures thereof,
a step for vulcanizing the entire portions thereof, and
a step for subjecting the outer rubber layer to buff processing.

8. The method of claim 7 wherein said fibrillated fibers are bast fibrillated fibers.

9. The method of claim 8 wherein said bast fibrillated fibers are selected from the group consisting of ramie fibrillated fibers, linen fibrillated fibers, jute fibrillated fibers, hemp fibrillated fibers and mixtures thereof.

10. The method of claim 7 wherein said fibrillated fibers are leaf fibrillated fibers.

11. The method of claim 10 wherein said leaf fibrillated fibers are selected from the group consisting of abaca fibrillated fibers, henequen fibrillated fibers and mixtures thereof.

* * * * *